Figure 1:
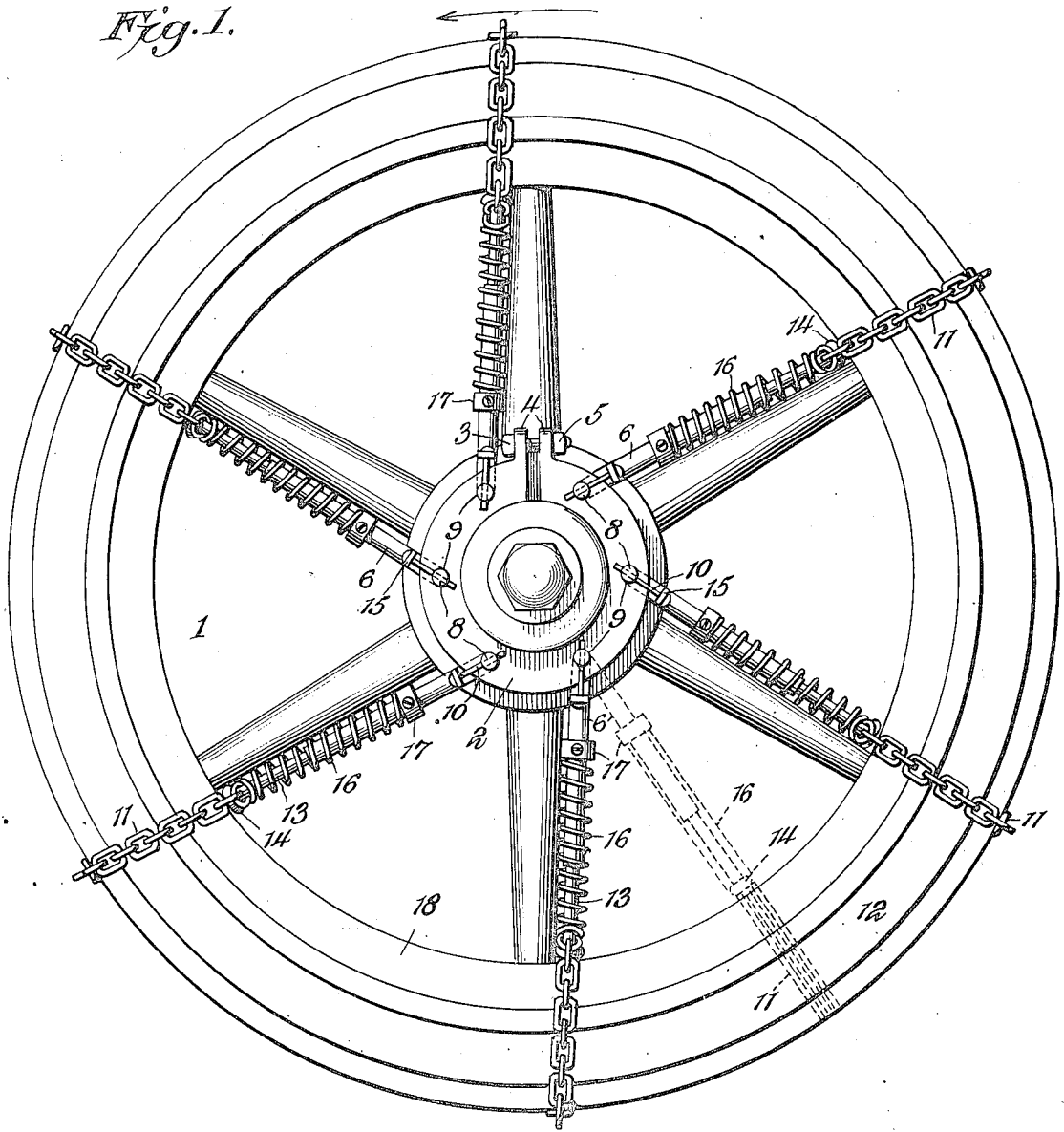

J. ADAMS.
NON-SKID DEVICE.
APPLICATION FILED MAY 23, 1919.
1,320,667.
Patented Nov. 4, 1919.
2 SHEETS—SHEET 2.
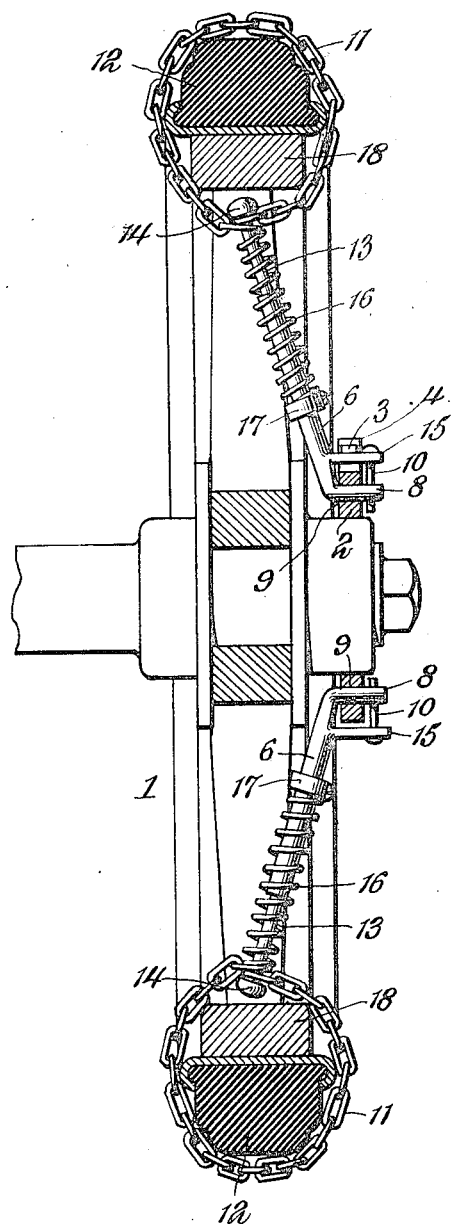
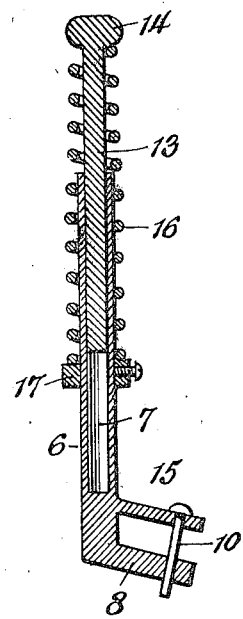
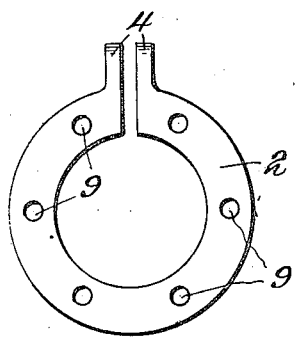
John Adams,
INVENTOR,
BY W. C. Carman
ATTORNEY

UNITED STATES PATENT OFFICE.

JOHN ADAMS, OF YOUNGSTOWN, OHIO.

NON-SKID DEVICE.

1,320,667.   Specification of Letters Patent.   Patented Nov. 4, 1919.

Application filed May 23, 1919. Serial No. 299,291.

*To all whom it may concern:*

Be it known that I, JOHN ADAMS, citizen of the United States, residing at Youngstown, in the county of Mahoning and State of Ohio, have invented certain new and useful Improvements in Non-Skid Devices, of which the following is a specification.

The object of my invention is to provide a strong, durable and substantial means for securing non-skid or traction members or elements to pneumatic or other tires, designed primarily for heavy trucks, and especially a means by which each of such members or elements may be secured absolutely independent of the others, so that each member or element and its attachment will constitute a unit of and by itself.

In the accompanying drawings Figure 1 represents a side elevation of a wheel with my invention attached; Fig. 2 is a vertical transverse view partially in section; Fig. 3 is a central longitudinal section showing in detail the construction of my attaching device; and Fig. 4 is a side elevation of the holding ring.

Similar reference characters designate corresponding parts of the device throughout the various figures of the drawings.

1 represents a wheel with my holding ring 2 rigidly clamped to the hub by means of the bolt 3 passing through the up-standing wings 4 and secured by the nut 5.

To this ring I attach what may be termed a guide rod or bar 6, of hollow or tubular formation 7, the inner end of which is turned at an angle, as at 8, for engagement with the hole 9 in the ring 2, where it is secured by the pin 10, thus providing a swinging or yielding connection between the bar 6 and the ring 2.

I use a flexible non-skid member or element 11 of just sufficient length to pass freely around the tire 12. Through the opposite end links or rings of this element I pass the stem 13 with the head 14, after which the stem is inserted in the hollow 7 of the tubular rod 6, thus providing a telescopic connection between the stem 13 and the rod 6, permitting a reciprocating movement between these two elements.

The bar 6 is provided with a finger 15 so disposed as to pass immediately outside of the ring 2 and so as to engage the periphery of the ring and hold the bar substantially in its normal position in case of breakage of the member 11, which ordinarily holds the bar up.

The coil spring 16 surrounds the bar 6 and the stem 13, one end of which contacts with the collar 17 on the bar 6 and the other end with the traction member on the stem 13, serves to hold the stem 13 up against the inner face of the rim 18 of the wheel, and also to hold the traction member up against the head 14, as well as to prevent the traction member from falling down on the stem in case of breakage of the former.

While the traction or non-skid member and its attachment, when first applied, will normally occupy a space between two spokes of the wheel, as shown in dotted lines in Fig. 1, it is obvious that as the vehicle moves forward or backward, the traction draft or strain will drag it back to the following spoke, as shown in full lines, thus placing the entire traction strain or draft upon the spoke instead of upon the attachment and the rim of the wheel, or either of them; while the reciprocating movement between the stem 13 and the bar 6 affords the compensation required by reason of these two elements moving circumferentially within the wheel.

I claim—

1. In a device of the character described, a vehicle wheel with a ring rigidly secured to the center thereof, in combination with a tubular guide rod engaging said ring, a flexible traction member surrounding the tire of the wheel, and a stem engaging said traction member and reciprocatingly mounted in the hollow of said guide rod.

2. In a device of the character described, a vehicle wheel with a ring rigidly secured to the center thereof, in combination with a tubular guide rod engaging said ring and provided with an out-standing finger member adjacent the point of engagement, a flexible traction member surrounding the tire of the wheel, and a stem engaging said traction member and reciprocatingly mounted in the hollow of said guide rod.

3. In a device of the character described, a vehicle wheel with a ring rigidly secured to the center thereof, in combination with a tubular guide rod engaging said ring and provided with an out-standing finger member adjacent the point of engagement, a flexible traction member surrounding the tire of the wheel, a stem engaging said traction member and reciprocatingly mounted in the hollow of said guide rod, and a coil spring surrounding said stem.

4. In a device of the character described, a vehicle wheel with a ring secured to the center thereof, in combination with a tubular guide rod having a swinging engagement with said ring, a flexible traction member surrounding the tire of the wheel, and a stem engaging said traction member and reciprocatingly mounted in the hollow of said guide rod.

5. In a device of the character described, a vehicle wheel with a ring rigidly secured to the center thereof, in combination with a tubular guide rod having a swinging engagement with said ring, and provided with an out-standing finger member adjacent the point of engagement, a flexible traction member surrounding the tire of the wheel, and a stem engaging said traction member and reciprocatingly mounted in the hollow of said guide rod.

6. In a device of the character described, a vehicle wheel with a ring rigidly secured to the center thereof, in combination with a tubular guide rod having a swinging engagement with said ring, and provided with an out-standing finger member adjacent the point of engagement, a flexible traction member surrounding the tire of the wheel, a stem engaging said traction member and reciprocatingly mounted in the hollow of said guide rod, and a coil spring surrounding said stem.

7. In a device of the character described, a vehicle wheel in combination with a tubular guide rod secured to the center thereof, a flexible traction member surrounding the tire of the wheel, and a stem engaging said traction member and reciprocatingly mounted in the hollow of said guide rod.

8. In a device of the character described, a vehicle wheel with a tubular guide rod secured to the center thereof, in combination with a flexible traction member surrounding the tire of the wheel, a stem engaging said traction member and reciprocatingly mounted in the hollow of said guide rod, and a coil spring surrounding said stem.

In testimony whereof I hereunto affix my signature in the presence of two witnesses.

JOHN ADAMS.

Witnesses:
PATTY DE VANEY,
W. Y. WILLIAMS.